(12) United States Patent
Cassagne et al.

(10) Patent No.: US 6,241,193 B1
(45) Date of Patent: Jun. 5, 2001

(54) GEOSTATIONARY SATELLITE STABILIZED ALONG THREE AXES WITH IMPROVED TEMPERATURE CONTROL

(75) Inventors: Jean-Christophe Cassagne, Mandelieu; Bernard Moschetti, La Roquette sur Siagne; Denis Lebleu, Pegomas; Pascal Courteau, Le Cannet, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/341,318

(22) PCT Filed: Feb. 6, 1998

(86) PCT No.: PCT/FR98/00226

§ 371 Date: Aug. 18, 1999

§ 102(e) Date: Aug. 18, 1999

(87) PCT Pub. No.: WO98/34832

PCT Pub. Date: Aug. 13, 1998

(30) Foreign Application Priority Data

Feb. 10, 1997 (FR) .................................................. 97 01471

(51) Int. Cl.[7] .................................................. B64G 1/50
(52) U.S. Cl. .............................................................. 244/163
(58) Field of Search ................................. 244/158 R, 163

(56) References Cited

U.S. PATENT DOCUMENTS

| 3,749,156 | 7/1973 | Fletcher et al. | 165/32 |
|---|---|---|---|
| 4,880,050 | 11/1989 | Nakamura et al. | 165/41 |
| 5,332,030 | * 7/1994 | Spencer et al. | 165/32 |
| 5,372,183 | * 12/1994 | Strickberger | 165/41 |
| 5,494,241 | * 2/1996 | Poulain | 244/163 |
| 5,839,696 | * 11/1998 | Caplin et al. | 244/159 |
| 5,957,408 | * 9/1999 | Hall et al. | 244/158 R |

FOREIGN PATENT DOCUMENTS

| 0647559 | 4/1995 | (EP) . |
|---|---|---|
| 2463058 | 2/1981 | (FR) . |

* cited by examiner

Primary Examiner—Charles T. Jordan
Assistant Examiner—Francis T. Palo
(74) Attorney, Agent, or Firm—Stevens, Davis, Miller & Mosher, LLP

(57) ABSTRACT

A geostationary satellite stabilized in its an orbit includes at least one first face, chosen from among an east face, which is transverse to orbit, and an earth face, which is permanently directed toward the Earth and orthogonal to the plane of the equator, and at least one second face, opposite to the first face, chosen from among a west face, transverse to the orbit and opposite the east face, and an anti-earth face, which is permanently directed away from the Earth and opposite the earth face. Thermal coupling is arranged at least between the first face and the opposite second face so that the normally minimal heat removal capacity of the first face of the satellite is increased by transferring large amounts to heat to the opposite face via the thermal coupling.

6 Claims, 2 Drawing Sheets

GEOSTATIONARY SATELLITE STABILIZED ALONG THREE AXES WITH IMPROVED TEMPERATURE CONTROL

BACKGROUND OF THE INVENTION

1. Field of the Invention

The present invention relates to three-axis stabilized geostationary satellites and, more particularly, to the thermal control of the said satellites.

2. Description of the Related Art

It is known that electronic equipment carried on board satellites dissipates energy in the form of heat. To maintain the said equipment within an optimal operating temperature range, it is therefore necessary to remove, from the satellite, the excess thermal energy. It is moreover known that such removal of thermal energy can only be achieved through radiation into space.

In the case of a three-axis geostationary satellite stabilized in its orbit, especially a telecommunications satellite, comprising a north face and a south face, which are opposite one another and respectively orthogonal to the axis of the poles of the Earth, it is usual for the radiation of the heat from the satellite into space to be effected by the said north and south faces, used as a thermal radiator. Such a process of heat removal is advantageous since the said north and south faces:

undergo, over an annual period, minimum exposure to sunlight relative to the other faces of the satellite; and have constant illumination over one day, that is to say over one revolution, thereby making it possible to avoid overly large temperature variations.

However, in the case of very large thermal energy dissipation by the said electronic equipment, it may happen that the removal of heat by the north and south faces is insufficient to afford the said equipment an optimal operating temperature.

The object of the present invention is therefore to increase the on-board heat removal capabilities of a satellite, so as to avoid this drawback.

SUMMARY OF THE INVENTION

To this end, according to the invention, the geostationary satellite stabilized in its orbit along three of its axes and comprising at least one first face and at least one second face, which are such that a first face is illuminated by the sun when a second face is in shadow and vice versa, is noteworthy in that it comprises means of thermal coupling between at least one first face and at least one second face.

Thus, according to the invention, at least one first face and at least one second face are together considered as a whole for additional thermal control of the satellite, by transferring the excess thermal power from the sunlit side of the satellite (which has a minimum capacity for sinking heat to the outside) to the side in shadow, which has a high potential for removing heat to the outside. The overall heat sinkage capacity for the satellite is thus increased as is therefore its radio-frequency power.

In an advantageous embodiment, in order to ease the removal, to the outside of the satellite, of the heat generated by radiating devices (electronic equipment) mounted on board the said satellite, these radiating devices are at least in part carried by the said first and second faces and the said means of thermal coupling ensure the transfer of heat between the said devices carried by at least one first face and the said devices carried by at least one second face. Thus, the heat generated by radiating devices carried by a face illuminated by the sun (and hence hardly if at all thermally dissipating) is transmitted from the shadow side of the satellite where it can more easily be dissipated to the outside.

Such first and second faces may consist of an east face and a west face, which are opposite one another and respectively transverse to the said orbit. Likewise, first and second faces may consist of an earth face, permanently directed toward the Earth, and an anti-earth face, permanently directed away from the Earth, the said earth and anti-earth faces being respectively orthogonal to the plane of the equator.

The said means of thermal coupling may consist of any device able to conduct heat. However, preferably, such means of coupling are heat pipes (also generally referred to as fluid loops) containing an evaporatable and condensable fluid alternately undergoing switches from the liquid phase to the vapor phase and then from the vapor phase to the liquid phase.

Especially in the case of a satellite for telecommunications, the said heat-radiating devices may be traveling-wave tubes, generally designated by the initials TWT, especially those said to have a radiating collector allowing large transmission powers. Such traveling-wave tubes have a collector operating at a very high temperature, of the order of 200° C. as compared with the body of the tube which remains at a temperature of the order of 80° C. In this case, it is advantageous for the bodies of the said traveling-wave tubes to be fixed on first and second faces of the satellite and for their collectors to be disposed outside the said satellite, at least on the side of one of the latter's north or south faces.

BRIEF DESCRIPTION OF THE DRAWINGS

The figures of the appended drawing will elucidate the manner in which the invention may be embodied. In these figures, identical references denote similar elements.

DETAILED DESCRIPTION OF THE PREFERRED EMBODIMENT

Figure 1:
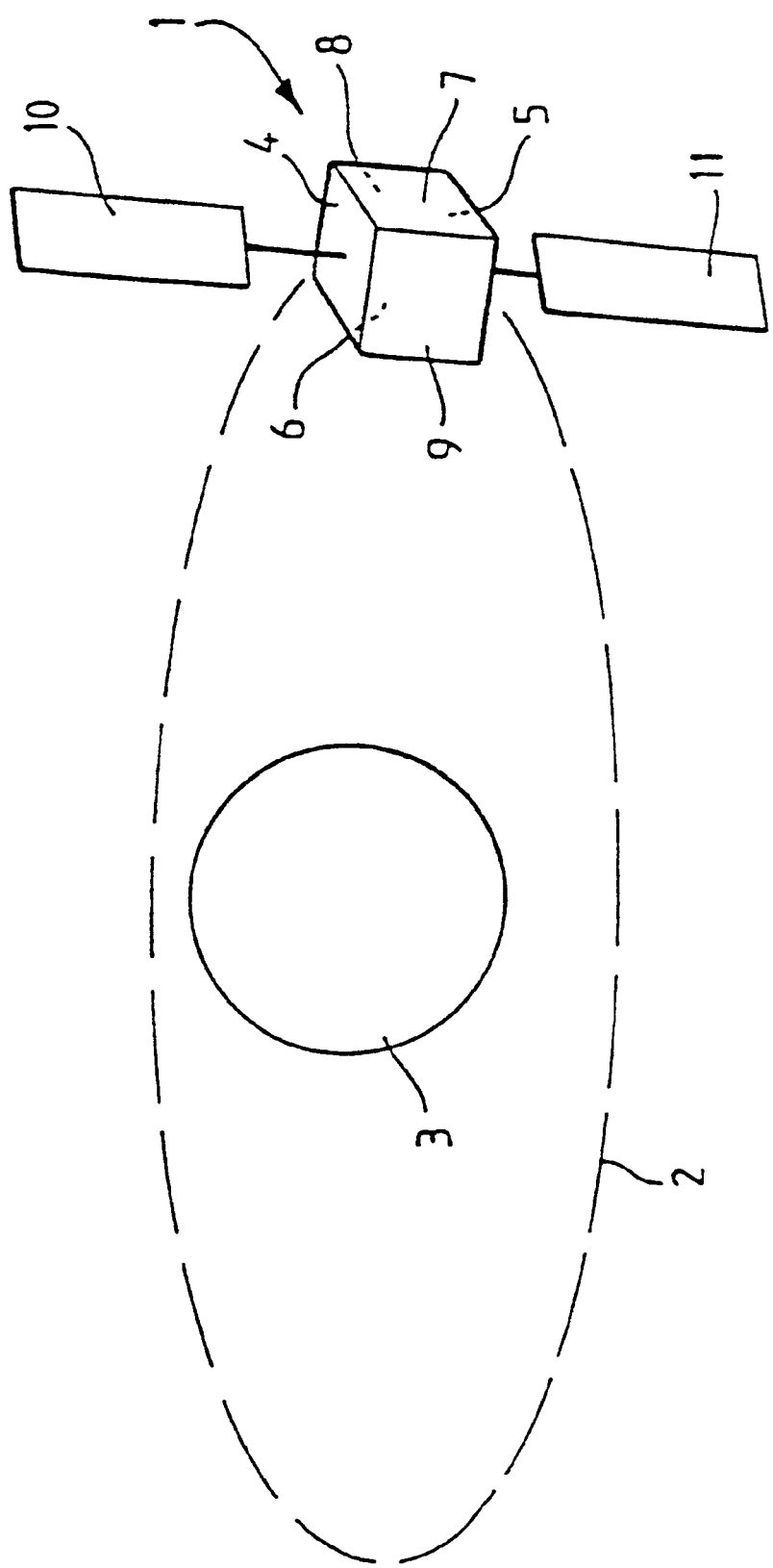
FIG. 1 diagrammatically illustrates a satellite in accordance with the present invention in its geostationary orbit.

Represented in FIG. 1 is a geostationary satellite 1 stabilized in its orbit 2 around the Earth 3 along three of its axes. This satellite 1 has a parallelepipedal shape comprising a north face 4 and a south face 5 which are perpendicular to the axis of the poles of the Earth, as well as an earth face 6, an anti-earth face 7, an east face 8 and a west face 9, these last four faces 6 to 9 being orthogonal to the plane of the equator.

The earth face 6 and anti-earth face 7 are respectively, continuously, directed toward the Earth and away from the Earth. The east face 8 and west face 9 are transverse to the orbit 2.

Photovoltaic panels 10 and 11 are provided so as to supply the satellite 1 with electrical energy.

As a general rule, the thermal control of a satellite, such as the satellite 1, is achieved by using the north and south panels 4 and 5 alone as radiators, as was explained above, these panels possibly being coupled.

In accordance with the present invention, in the satellite 1, it is also possible to use the faces 6 to 9.

Figure 2:
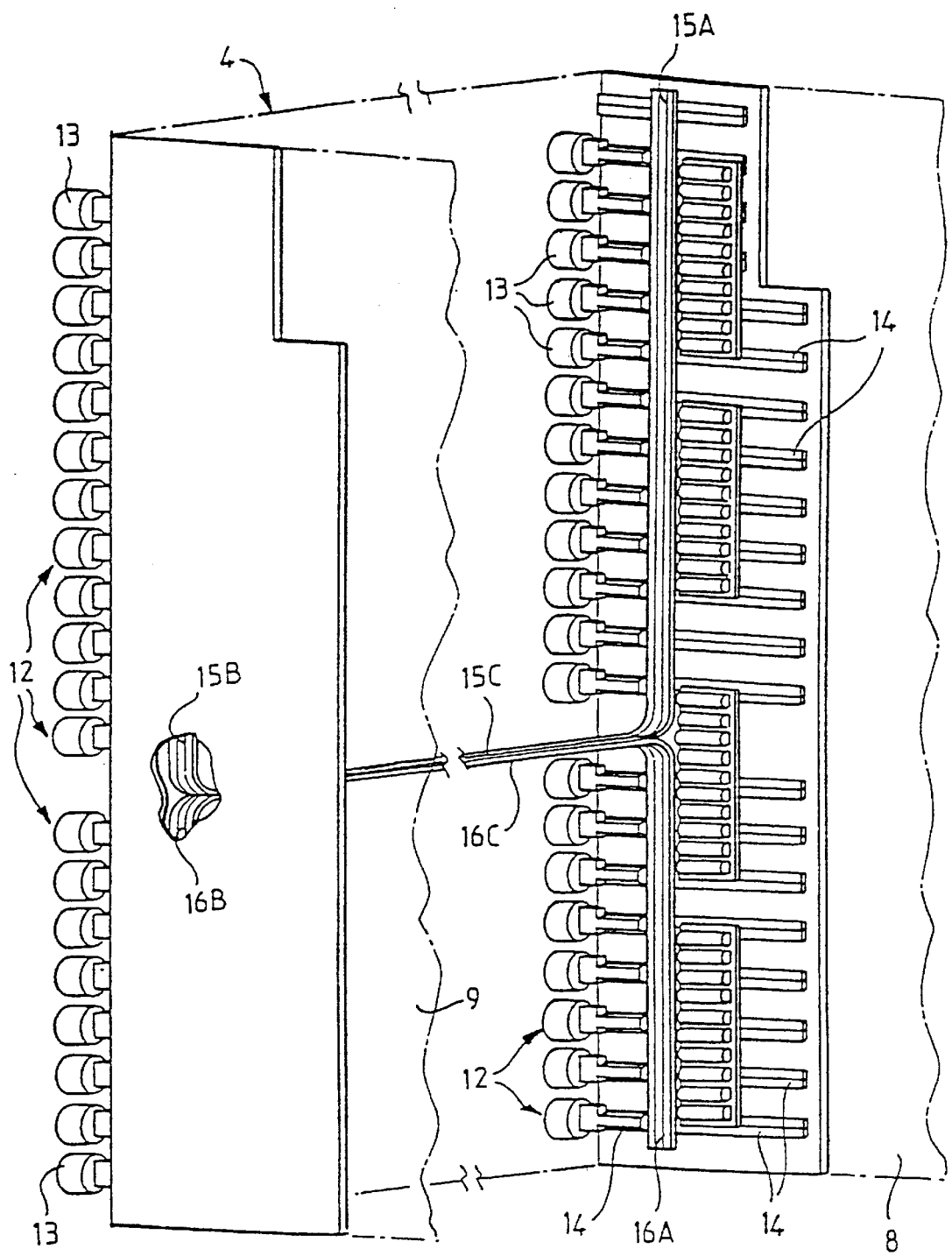
FIG. 2 illustrates, in perspective, an embodiment of the invention.

As shown by FIG. 2, the satellite 1 encloses heat-radiating devices 12, for example traveling-wave tubes.

In the particular embodiment of FIG. 2, these traveling-wave tubes 12 are mounted in such a way that their radiating collectors 13 project with respect to the north face 4, while their bodies 14 are carried respectively by the east and west faces 8 and 9. Moreover, the bodies 14 of the traveling-wave tubes carried by the east face 8 are thermally coupled to the bodies 14 of the traveling-wave tubes 12 carried by the west face 9, by means of heat pipes 15 and 16. These heat pipes are of the fluid loop type and enclose an evaporatable and condensable fluid alternately undergoing switches from the liquid phase to the vapor phase and vice versa.

Each of the heat pipes 15 and 16 comprises, in the example represented, a branch 15A or 16A in contact with the bodies 14 carried by the east face 8, a branch 15B or 16B in contact with the bodies 14 carried by the west face 9 and a middle part 15C or 16C linking the said branches 15A and 15B or 16A and 16B.

A similar disposition of the radiating devices 12 can be provided on the south face 5 side.

Thus, thermal coupling is achieved between the east face 8 and west face 9.

From the foregoing, it will be readily understood, that according to the invention, the following could also be thermally coupled:

the earth face 6 and anti-earth face 7;

the east face 8 and west face 9, as well as the earth face 6 and anti-earth face 7;

the east face 8 simultaneously with the west face 9 and the earth face 6, etc., such thermal couplings having the objective of continuously transferring excess thermal power from the sunlit side to the shadow side of the satellite 1.

Through the implementation of the present invention, the heat-removal capacity of the satellite is therefore raised without increasing the latter's dimensions.

What is claimed is:

1. A geostationary satellite stabilized in its orbit along three of its axes, said satellite comprising:

at least one first face, chosen from among an east face, transverse to said orbit, and an earth face, permanently directed toward the Earth and orthogonal to a plane of the equator;

at least one second face opposite to the said first face, chosen from among a west face, transverse to the said orbit and opposite said east face, and an anti-earth face, permanently directed away from the Earth and opposite said earth face; and means for thermal coupling arranged at least between said first face and said second face.

2. The geostationary satellite according to claim 1, wherein said first and second faces carry heat-radiating devices and said means for thermal coupling provide the transfer of heat between said heat-radiating devices carried by said at least one first face and said heat-radiating devices carried by said at least one second face.

3. The geostationary satellite according to claim 2, wherein said heat-radiating devices are traveling-wave tubes.

4. The geostationary satellite according to claim 3, further comprising a north face and a south face, which are opposite one another and orthogonal to the axis of the poles of the Earth, wherein the bodies of said traveling-waves tubes are fixed on said first and second faces and the collectors of said traveling-wave tubes are disposed outside said satellite, at least on a side of one of the said north and south faces.

5. The geostationary satellite according to claim 1, wherein said means for coupling are heat pipes containing an evaporatable and condensable fluid alternately undergoing a switch from a liquid phase to a vapor phase, and from the vapor phase to the liquid phase.

6. A geostationary satellite stabilized in its orbit along three of its axes, said satellite comprising:

at least one first face, chosen from among an east face, transverse to said orbit, and an earth face, permanently directed toward the Earth and orthogonal to a plane of the equator;

at least one second face opposite to said first face, chosen from among a west face, transverse to said orbit and opposite said east face, and an anti-earth face, permanently directed away from the Earth and opposite said earth face, said at least second face being in shadow when said at least first face is illuminated by the sun, and vice-versa; and means for thermal coupling arranged at least between said at least first face and said at least second face, in such a way that said at least first face and said at least second face form a thermal control for the satellite in which said thermal coupling means transfers heat from that of said at least first face or said at least second face which is illuminated by the sun to that of said at least second face or said at least first face which is in shadow.

* * * * *